United States Patent
Rollender

(10) Patent No.: US 7,764,944 B2
(45) Date of Patent: Jul. 27, 2010

(54) METHOD OF PROVIDING A UNIQUE CALL BACK NUMBER FOR WIRELESS 9-1-1 CALLS

(75) Inventor: Douglas Harold Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 671 days.

(21) Appl. No.: 10/877,011

(22) Filed: Jun. 25, 2004

(65) Prior Publication Data

US 2005/0287979 A1 Dec. 29, 2005

Related U.S. Application Data

(60) Provisional application No. 60/582,615, filed on Jun. 24, 2004.

(51) Int. Cl.
*H04M 11/04* (2006.01)
*H04W 40/00* (2009.01)
*H04B 7/00* (2006.01)

(52) U.S. Cl. ............... 455/404.1; 455/404.2; 455/445; 455/521

(58) Field of Classification Search ............ 455/404.1, 455/404.2, 445, 426, 521
See application file for complete search history.

(56) References Cited

U.S. PATENT DOCUMENTS 5,392,052 A   2/1995   Eberwine (Continued)

FOREIGN PATENT DOCUMENTS

EP   1 124 394   8/2001

OTHER PUBLICATIONS

"NENA Technical Information Document (TID) On PSAP Call Back to All 9-1-1 Callers, Combating Wireles E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.

(Continued)

*Primary Examiner*—Nick Corsaro
*Assistant Examiner*—Shannon R Brooks
(74) *Attorney, Agent, or Firm*—Harness, Dickey & Pierce

(57) ABSTRACT

A method of communication to at least one wireless unit originating an emergency call. The method includes the step of receiving one or more routing tags associated with a wireless unit originating a "9-1-1" call. A routing tag may comprise, for example, a string of numbers corresponding with Emergency Service Routing Digits ("ESRD") and/or an Emergency Service Routing Key ("ESRK"). In addition to the routing tag, a mobile equipment identification number ("MEIN") and/or a paging identity ("PGID") may also be received by a database accessible by wireless network infrastructure elements, such as a mobile switching center ("MSC"), as well as the emergency call center, including the local public service answering point, for example. In response to this receiving step, at least one unique identifier (e.g., unique call back number) may be generated. This unique identifier may be a dialable number to enable the emergency call center to call back the wireless unit originating the "9-1-1" call. Thereafter, the unique identifier may be transmitted back to the MSC, along with the emergency call center, for example. Consequently, an emergency call back may be launched by the emergency call center using the unique identifier to reach the MSC generally, and more particularly, the wireless unit originating the "9-1-1" call.

12 Claims, 4 Drawing Sheets

U.S. PATENT DOCUMENTS

| | | | |
|---|---|---|---|
| 5,689,548 | A | 11/1997 | Maupin et al. |
| 5,712,900 | A | 1/1998 | Maupin et al. |
| 5,864,755 | A | 1/1999 | King et al. |
| 5,937,344 | A | 8/1999 | Zicker |
| 5,949,865 | A | 9/1999 | Fusinato |
| 6,014,556 | A | 1/2000 | Bhatia et al. |
| 6,038,437 | A * | 3/2000 | Zicker .................. 455/404.1 |
| 6,128,481 | A | 10/2000 | Houde et al. |
| 6,157,832 | A | 12/2000 | Lahtinen |
| 6,556,816 | B1 | 4/2003 | Gafrick et al. |
| 6,571,092 | B2 | 5/2003 | Faccin et al. |
| 6,584,307 | B1 | 6/2003 | Antonucci et al. |
| 6,766,159 | B2 | 7/2004 | Lindholm |
| 6,922,565 | B2 * | 7/2005 | Rhodes et al. ........... 455/456.1 |
| 6,940,950 | B2 * | 9/2005 | Dickinson et al. ............ 379/45 |
| 6,990,349 | B1 | 1/2006 | Idrissi |
| 7,103,153 | B2 | 9/2006 | Stumer et al. |
| 7,155,201 | B2 | 12/2006 | Lugo Saucedo et al. |
| 7,174,149 | B2 | 2/2007 | Chin et al. |
| 7,251,312 | B2 | 7/2007 | D'Evelyn et al. |
| 7,302,250 | B2 | 11/2007 | Chin et al. .................. 455/410 |
| 2002/0111159 | A1 | 8/2002 | Faccin et al. ................ 455/422 |
| 2004/0141607 | A1 | 7/2004 | Rollender ................ 379/210.1 |
| 2004/0203565 | A1 | 10/2004 | Chin et al. ............... 455/404.1 |
| 2004/0203573 | A1 | 10/2004 | Chin et al. ............... 455/404.1 |
| 2004/0203574 | A1 | 10/2004 | Chin et al. ............... 455/404.1 |
| 2004/0242191 | A1 | 12/2004 | Hossain et al. |
| 2005/0014481 | A1 | 1/2005 | Chin et al. |
| 2005/0053209 | A1 * | 3/2005 | D'Evelyn et al. ........... 379/111 |
| 2005/0200492 | A1 | 9/2005 | Woodard et al. |

OTHER PUBLICATIONS

European Office Action dated Nov. 10, 2006.

Jeffrey M. Pfaff, "Sprint PCS Comments, Enhanced 911 Emergency Calling Systems," 'Online!, (Sep. 18, 2000), pp. 1-17.

European Search Report, Appl. No. 05253822.0-2412 PCT/, (Oct. 19, 2005).

"NENA Technical Information Document SS7 Guidelines for MSC to Selective Router Connectivity", NENA Technical Information Document, NENA-05-501, Oct. 16, 2002, Prepared by National Emergency Number Association (NENA) Technical Committee Chairs, Published by NENA, 422 Beecher Rd, Columbus, Ohio, 43230 USA.

"Requirments for communication of citizens with authorities/organizations in case of distress (emergency call handling)", Draft ETSI SR 002 180, V. 1.1.1 (Dec. 2003), ETSI, France, http://www.etsi.org.

Dale N. Hatfield, "A Report on Technical and Operational Issues Impacting the Provision of Wireless Enhanced 911 Services", (Apr. 21, 2005), paragraph 2.2.4.

* cited by examiner

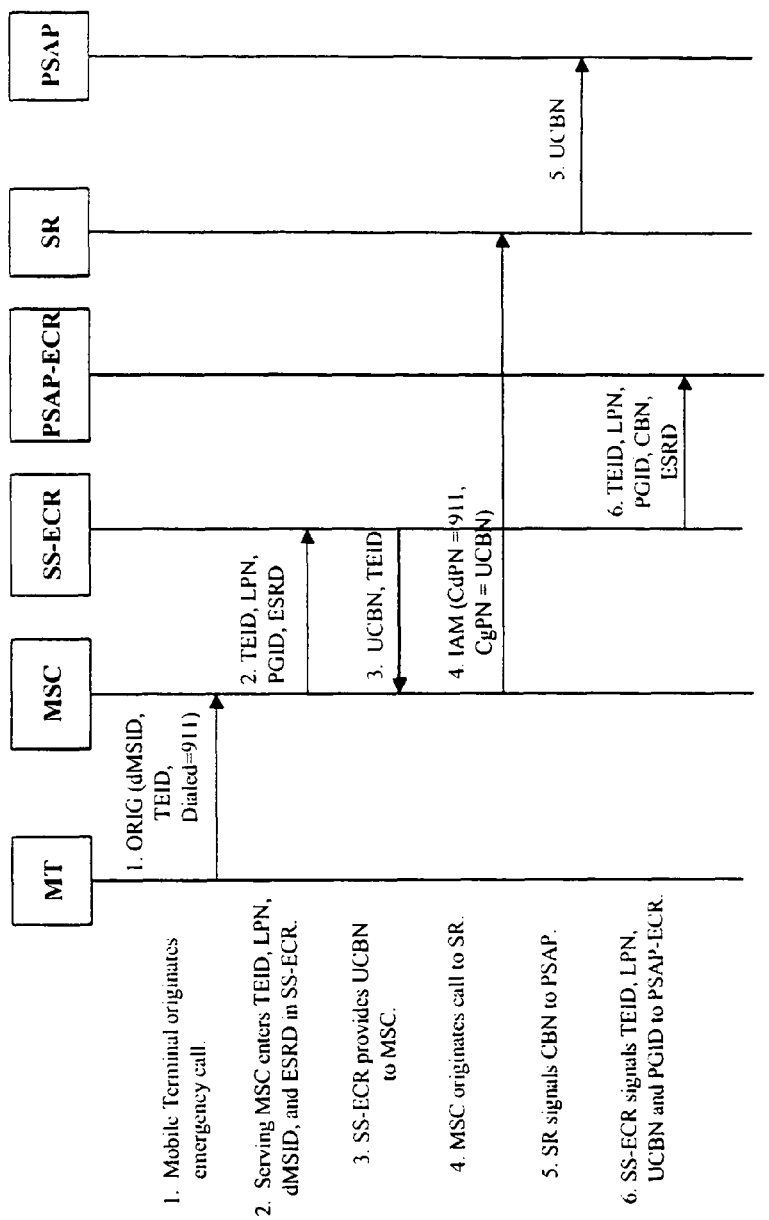

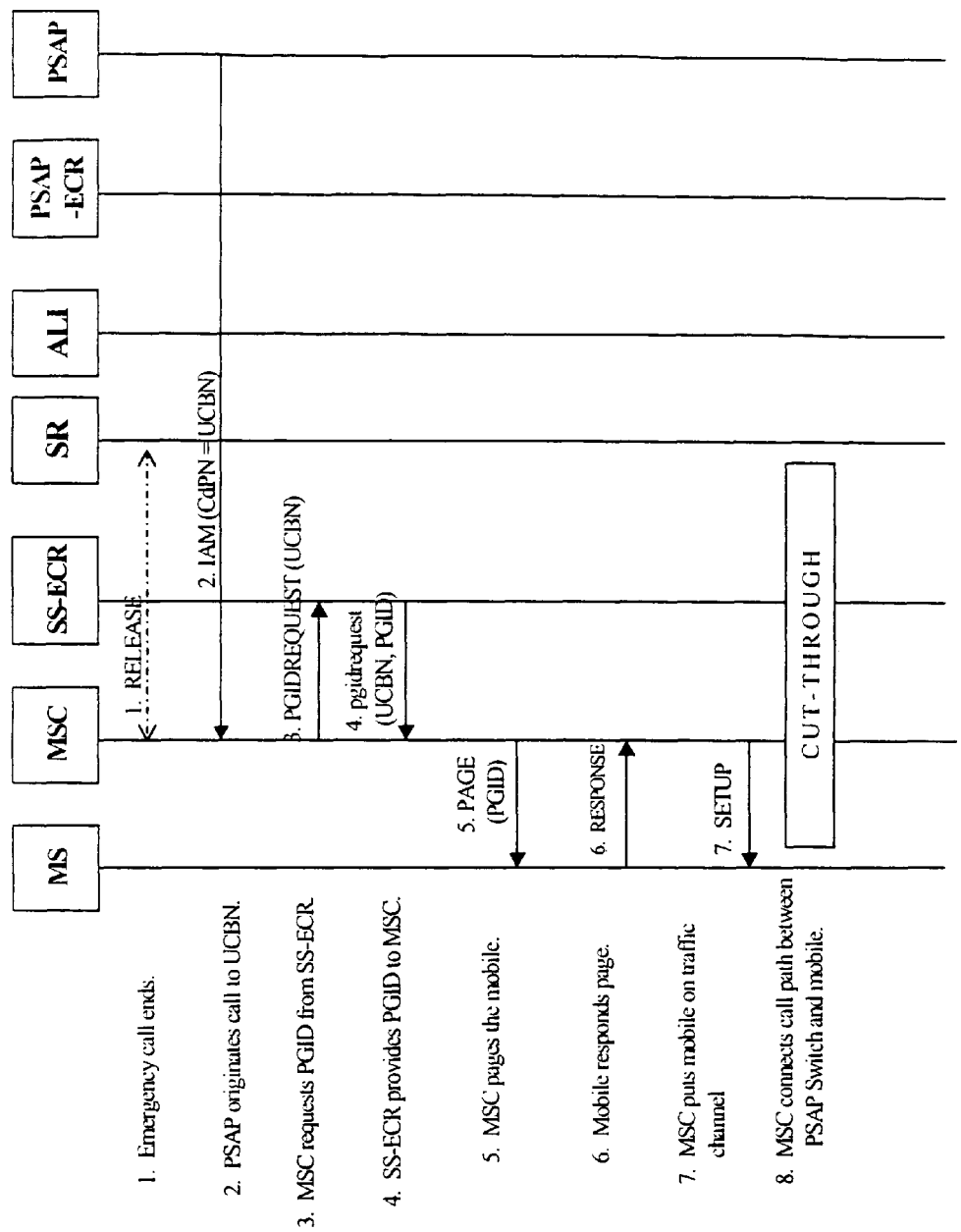

METHOD OF PROVIDING A UNIQUE CALL BACK NUMBER FOR WIRELESS 9-1-1 CALLS

CROSS-REFERENCE TO RELATED APPLICATION

This application claims priority of Provisional Application Ser. No. 60/582,615 which was filed Jun. 24, 2004.

BACKGROUND OF THE INVENTION

I. Field of the Invention

The present invention relates to telecommunications, and more particularly, to wireless communications.

II. Description of the Related Art

Emergency service calls in North America may be originated by dialing "9-1-1." Other parts of the world may use another abbreviated string of dialable digits, such as "6-1-1" in Mexico, for example. These abbreviated string of digits are intended to simplify an emergency call for help with an easy to remember number. These emergency calls may be routed to a local Public Service Answering Point ("PSAP") call center to enable the initiation of an emergency response (e.g., police, fire department, road repair, and/or ambulance) while the caller is kept on the phone. If, however, the call is somehow disconnected or dropped before the emergency is completely reported or the responder arrives, the PSAP call center may be required to call back the originator.

Presently, a record for a "9-1-1" call originated through a wired network may include Automatic Line Identification ("ALI") or the telephone number of the access line from which the call originated. The directory number ("DN") or telephone number of a wireless subscriber may not, however, be associated with a physical line or wireless unit. Calls to a roaming wireless subscriber are routed to the wireless unit by way of the mobile station identification ("MSID"), as opposed to the mobile DN ("MDN"). Accordingly, performing an emergency call back to a wireless unit poses hurdles not encountered with landline devices, for example.

The MSID may typically be characterized as either a 10-digit mobile identification number ("MIN") or a 15-digit International Mobile Subscriber Identifier ("IMSI"). The IMSI may be programmed into a wireless unit or a Subscriber Identity Module ("SIM") card by the service provider with whom the wireless unit user has entered into a service agreement. Accordingly, the MSID may not necessarily be a dialable number.

The DN of a wireless unit is a dialable number. The DN is dialed by a caller and used to route a call through the network to the wireless subscriber's home system. At the subscriber's home system, the home location register ("HLR") contains the MSID associated with the subscriber's DN. The MSID, as opposed to the DN, may then be used to route the call through the network to the serving wireless system and page the subscriber. The subscriber's DN may be provided to the serving system from the SIM card through the wireless unit or by the home system to the serving system in a separate data file called the subscriber profile.

The rollout of systems employing a separate number for DN and MSID is a relatively recent occurrence for some wireless systems. Others have used this technique since their inception. Historically, the mobile identification number of a wireless unit was the same as the DN for some systems, particularly in systems supportive of TIA/EIA-41 standards, prior to implementing wireless number portability ("WNP") or thousands block number pooling ("TBNP") based on the Local Routing Number ("LRN") method and international roaming ("IR"). However, with WNP and TBNP, the MDN became "portable" or "poolable" from one service provider to another service provider. Since MSID may not be portable or poolable, the recipient service provider may assign a new MSID for a subscriber with a ported-in or pooled MDN.

International roaming has also forced the separation of MSID and MDN. While the MIN is a 10-digit number modeled after the North American Numbering Plan's 10-digit MDN, other nation's carriers using a different directory numbering plan may not allow their subscriber's DN to be equivalent to the internationally recognized MIN format. Another standard MSID is the IMSI. It may be used in TIA/EIA-41 and GSM systems around the world. IMSI is a 15-digit nondialable number based on ITU-T Recommendation E.212, and therefore, may not serve as a 10-digit MDN.

Historically, when the MDN was the same as the MIN, the MIN would be delivered to a PSAP call center and would be used as a call back number. With the separation of MIN and MDN as described above, it became necessary to deliver the MDN as a separate call back number to the PSAP call center, as well as the caller's MSID. There are certain problems, however, associated with implementing this solution. One issue is that the serving system may not have the caller's MDN, only the MSID, to present to the PSAP call center with the call. Some of the reasons for this relate to the way MSID-MDN separation has been implemented according to standards. Another reason is that the network interface used to deliver the call to the PSAP call center may not have the capacity to signal both the DN and MSID or, in some cases, even a full DN.

An old serving TIA/EIA-41 system may not support WNP, TBNP or IR. This means that the older serving system may be expecting the MIN and the MDN to be the same. The older system would not even know to look for a separate MDN in the subscriber's service profile (e.g., keyed on MIN, not MDN). With this limitation, these subscribers may not be allowed to use basic services, but they must be allowed to call for emergency services. As a result, a roamer who dials "9-1-1" while on an old system will have his or her call delivered to the PSAP call center with an MSID but no MDN. Accordingly, no call back is possible.

A newer serving system that is WNP and IR capable may not be able to deliver MDN to the PSAP call center. This could happen if the calling wireless unit is not registered with any service provider (e.g., there are mobile phones used for emergency calls only). These wireless units may be referred to as non-subscriber initialized ("NSI") phones. It is also possible for a subscriber to place an emergency call before the HLR has responded to the serving system with the subscriber's service profile containing the DN. Even if the PSAP call center has been provided with a working DN for callback, the callback to the DN will not go through if the subscriber has call forwarding service for all inbound calls or if the subscriber has a limited, pre-paid service and there is no remaining balance available to pay for the inbound callback from the PSAP call center. Further, if the callback number is to a visiting international roamer, the PSAP call center may need to place an international call. Some PSAP call center may not have the ability to callback an international number. There is also the risk of network congestion or delay in completing an international call that would be detrimental to handling an emergency in a timely manner. Some PSAP call centers may not even be equipped to place any outbound calls through separate, outbound administrative lines.

The call back DN for an international roamer would require the PSAP call center to place an international call to reach a subscriber in their local Emergency Service Zone ("ESZ").

This is not a practical, timely or sufficiently reliable solution for a PSAP call center that normally does not place international calls and for applications that may require immediate call back information for emergency purposes. In addition, the entire international MDN (up to 15 digits including a country code) may not be presented to the PSAP call center for call back if the PSAP call center only supports 10 digits.

It is also possible that the calling wireless unit is not registered with any service provider. As a result, there may be no DN associated with the wireless unit or no permanent MSID encoded in the wireless unit—such wireless units are referred to as NSI mobile phones, for example. This could be because (a) the NSI phone was never intended to be registered (there are such phones to use for emergency calls only), (b) the phone is new and has not yet been initialized by a service provider, (c) the subscription has expired and the NSI phone is no longer registered with a service provider or (d) the SIM card is lost, stolen, or simply never been inserted or been removed either advertently or inadvertently.

Some wireless units also support a removable User Identity Module ("R-UIM") or SIM that may contain the MSID and the DN. If the R-UIM or SIM are not in the phone, then it can still be used to place an emergency call. However, there is no DN or MSID known to the phone or the serving system to provide the PSAP call center as a call back number.

Every MS contains a unique mobile equipment identification number ("MEIN") encoded in the phone by the manufacturer. The MEIN may be, for example, an electronic serial number ("ESN"), as used in ANSI/TIA/EIA-41 systems or an International Mobile Equipment Identity ("IMEI") used in GSM systems. The MEIN is independent of the MSID and DN. The MEIN is signaled over the air between the wireless unit and the base station of a wireless system with a call origination attempt or soon thereafter. For example, if not supplied with the call origination attempt, the MEIN may be requested by the serving system.

Current standards for wireless emergency services call for delivering "9-1-1+the last seven digits of the MEIN" to the PSAP call center as the form call back number when the directory number assigned to the wireless subscriber is not available. While this may serve to notify the PSAP call center that no working callback number is available with the call, the string of "9-1-1+the last seven digits of the MEIN (MEIN7)" do not uniquely identify the call (i.e., many emergency calls may be identified by the same "9-1-1+MEIN7") and is not a routable number through the network. This is because the "9-1-1+the last seven digits of the MEID" do not contain a complete MEID, and therefore is not unique.

While the hereinabove approach provides the PSAP call center with some measure for performing an emergency call back of a wireless unit, several hurdles still exist. For example, the callback number for a wireless unit in certain circumstances may be nothing more than a dummy number with user location data. Consequently, a need exists for a method and system architecture for uniquely identifying each wireless unit originating a "9-1-1" call. Furthermore, there is a demand for a unique identifier that may be used to enable the PSAP call center to launch a call back of the wireless unit originating a "9-1-1" call.

SUMMARY OF THE INVENTION

The present invention provides for uniquely identifying one or more wireless units originating a "9-1-1" call. More particularly, the present invention provides for enabling the call back of a wireless unit originating a "9-1-1" call using a unique identifier. For the purposes of the present disclosure, a unique identifier may correspond with a unique call back number for enabling an emergency call center (e.g., a local public service answering point) to launch a call back of the wireless unit(s) that originated the "9-1-1" call. This unique call back number may be generated from a string of numbers corresponding with a local public safety number ("LPN") associated with wireless network infrastructure element(s), such as a mobile switching center ("MSC"), for example.

In an embodiment of the present invention, a method includes the step of receiving one or more routing tags associated with a wireless unit originating a "9-1-1" call. A routing tag may comprise, for example, a string of numbers corresponding with Emergency Service Routing Digits ("ESRD") and/or an Emergency Service Routing Key ("ESRK"). In addition to the routing tag, a mobile equipment identification number ("MEIN") and/or a paging identity ("PGID") may also be received by a database accessible by wireless network infrastructure elements, such as an MSC, as well as the emergency call center, including the local public service answering point, for example. In response to this receiving step, at least one unique identifier (e.g., unique call back number) may be generated. This unique identifier may be a dialable number to enable the emergency call center to call back the wireless unit originating the "9-1-1" call. Thereafter, the unique identifier may be transmitted back to the MSC, along with the emergency call center, for example. Consequently, an emergency call back may be launched by the emergency call center using the unique identifier to reach the MSC generally, and more particularly, the wireless unit originating the "9-1-1" call.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below:

FIGS. 3 and 4 depict alternate embodiments of the present invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides for uniquely identifying one or more wireless units originating a "9-1-1" call. More particularly, the present invention provides for enabling the call back of a wireless unit originating a "9-1-1" call using a unique identifier. For the purposes of the present disclosure, a unique identifier may correspond with a unique call back number for enabling an emergency call center (e.g., a local public service answering point) to launch a call back of the wireless unit(s) that originated the "9-1-1" call. This unique call back number may be generated from a string of numbers corresponding with a local public safety number ("LPN") associated with wireless network infrastructure element(s), such as a mobile switching center ("MSC"), for example.

Figure 1:
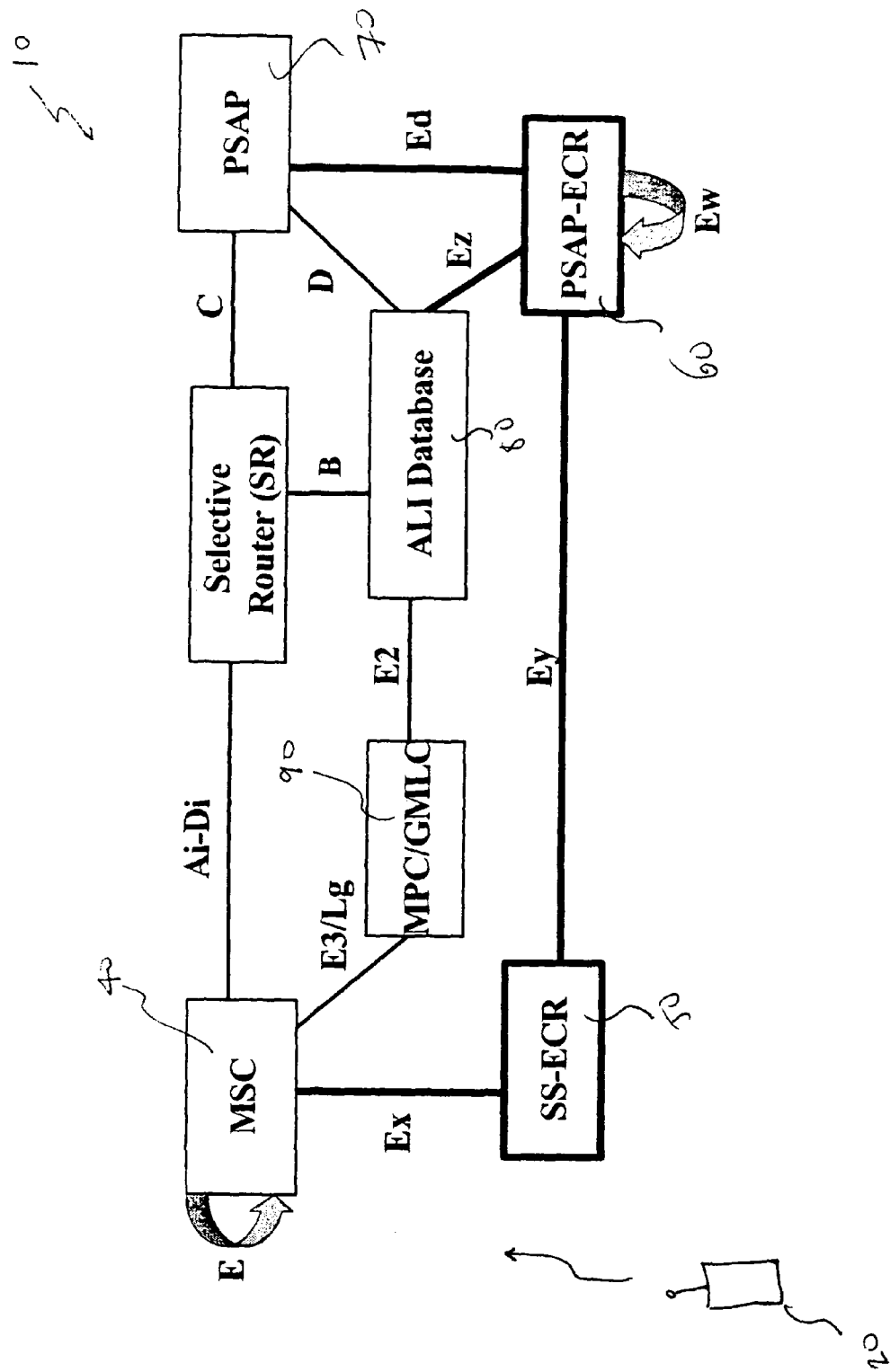
FIGS. 1 and 2 depict an architecture and flow chart of an embodiment of the present invention.

Referring to FIG. 1, an embodiment of the present invention is illustrated. FIG. 1 is reflective of an architecture 10 of a network reference model ("NRM") supporting mobile emergency service is shown. Architecture 10 supports the unique identification of a wireless unit originating an emergency "9-1-1" call and for enabling the call back of the wireless unit originating the emergency "9-1-1" call using a unique identifier.

As shown in FIG. 1, a wireless unit 20 is shown for communicating an emergency "9-1-1" call to architecture 10. For the purposes of the present disclosure, an emergency "9-1-1" call corresponds with a call and/or a request for emergency services (e.g., police, fire department, road repair, and/or ambulance). The communication, as originated by wireless unit 20, is conveyed to a mobile switching center 40 ("MSC") through a base station (not shown).

Once the emergency "9-1-1" call is received by MSC 40, identification information associated with wireless unit 20 may be communicated to a serving system emergency call register 50 ("SS-ECR"). More particularly, the information associated with wireless unit 20 includes, for example, a mobile equipment identification number ("MEIN"). The transfer of the MEIN to ECR-SS 50 is performed by MSC 40 over a first NRM interface, $E_x$. It should be noted that the MEIN, as transferred to SS-ECR 50, might be realized by an International Mobile Equipment Identity ("IMEI"), electronic serial number ("ESN"), pseudo ESN ("pESN") and/or mobile equipment identity ("MEID").

Along with transferring the MEIN, MSC 40 may also communicate a paging identity ("PGID") to SS-ECR 50. In the event that the emergency "9-1-1" call from wireless unit 20 is dropped or disconnected from the base station and MSC 40, the PGID may be used to page wireless unit 20. To page wireless unit 20 in the circumstance of a call drop or disconnect, a local public safety number ("LPN") of MSC 40 may be needed to uniquely identify the switch serving "9-1-1" caller (e.g., wireless unit 20). The LPN may be realized by a dialable number from a native or non-portable number block assigned to MSC 40. The LPN may assist in identifying SS-ECR 50 and for originating a call back to the wireless unit originating the emergency "9-1-1" call in the event of a call drop or disconnect occurs.

In addition to the LPN, Emergency Service Routing Digits ("ESRD") or Emergency Service Routing Key ("ESRK") may also be employed for uniquely identifying the emergency "9-1-1" call. ESRD may not uniquely identify the emergency "9-1-1" call, while ESRK may support the communication of location information of wireless unit 20, as associated with the emergency "9-1-1" call. The network elements and interfaces involved in providing an ESRK may be realized, in one embodiment, using existing communication standards. It should be noted that the Emergency Service Routing Digits may include, in one example, a string of numbers associated with a cell sector of the mobile switching center in which the emergency call originates, while the Emergency Service Routing Key may include a string of numbers associated with at least one of a mobile positioning center and/or geographical mobile location center 90.

From the hereinabove, the PGID may be one of a number of communication standards-based identifiers supporting paging wireless unit 20 to deliver an inbound call if the emergency "9-1-1" call is dropped or disconnected. With respect to a GSM-based system, wireless unit 20 may be paged via an international mobile station identity ("IMSI") provided by wireless unit 20, a temporary mobile station identity ("TMSI") associated with the IMSI and/or an IMEI from wireless unit 20. In a CDMA2000 system, this paging step may be realized using a mobile identification number ("MIN"), an IMSI, a default mobile station identity ("dM-SID") from a non-subscriber initiated ("NSI") wireless unit(s), an ESN from wireless unit 20 and/or a pESN generated from an MEID within wireless unit 20.

With identification information associated with wireless unit 20 received from MSC 40, ECR-SS 50 may then redirect this information over a network interface, $E_y$, to another emergency call register ("ECR") 60 associated with a public service answering point ("PSAP") 70. Consequently, the MEIN, LPN, dMSID, ESRK and/or a unique identifier (e.g., unique call back number or "UCBN") may be re-transmitted from SS-ECR 50 to ECR 60. It should be noted that ECR 60 might be realized by a database. Other associated databases in, however, may be keyed on the ESRK, the MEIN, the mobile station identity (e.g., MIN or IMSI) and/or the directory number of the caller.

The E interfaces depicted support signaling of emergency data and service requests through architecture 10 between MSC 40 and PSAP 70. Call handling instructions from PSAP 70, such as to establish a callback through MSC 40, may be communicated from PSAP 70 to ECR 60 over an $E_d$ interface, on to SS-ECR 50 through an $E_y$ interface and from SS-ECR 50 to MSC 40 through an $E_x$ interface. Here, PSAP 70 may communicate with ECR 60 directly over the $E_d$ interface using a unique identifier (e.g., a unique call back number) as a key. Alternatively, PSAP 70 may communicate with ECR 60 indirectly through an automatic line identifier ("ALI") database 80 over the D and $E_z$ interfaces using ESRK or the unique identifier (e.g., a unique call back number) as key.

SS-ECR 50 and ECR 60 may be implemented as a single entity. As shown, however, SS-ECR 50 and ECR 60 are individual elements to allow consideration for one SS-ECR to serve one MSC and one SS-ECR to interface with many ECRs associated with PSAP 70. In addition, while one ECR may serve many PSAPs, one PSAP need only interface with one ECR. Moreover, PSAP 70 may have access to information in many ECRs through ECR networking over the $E_w$ interface.

Figure 2:
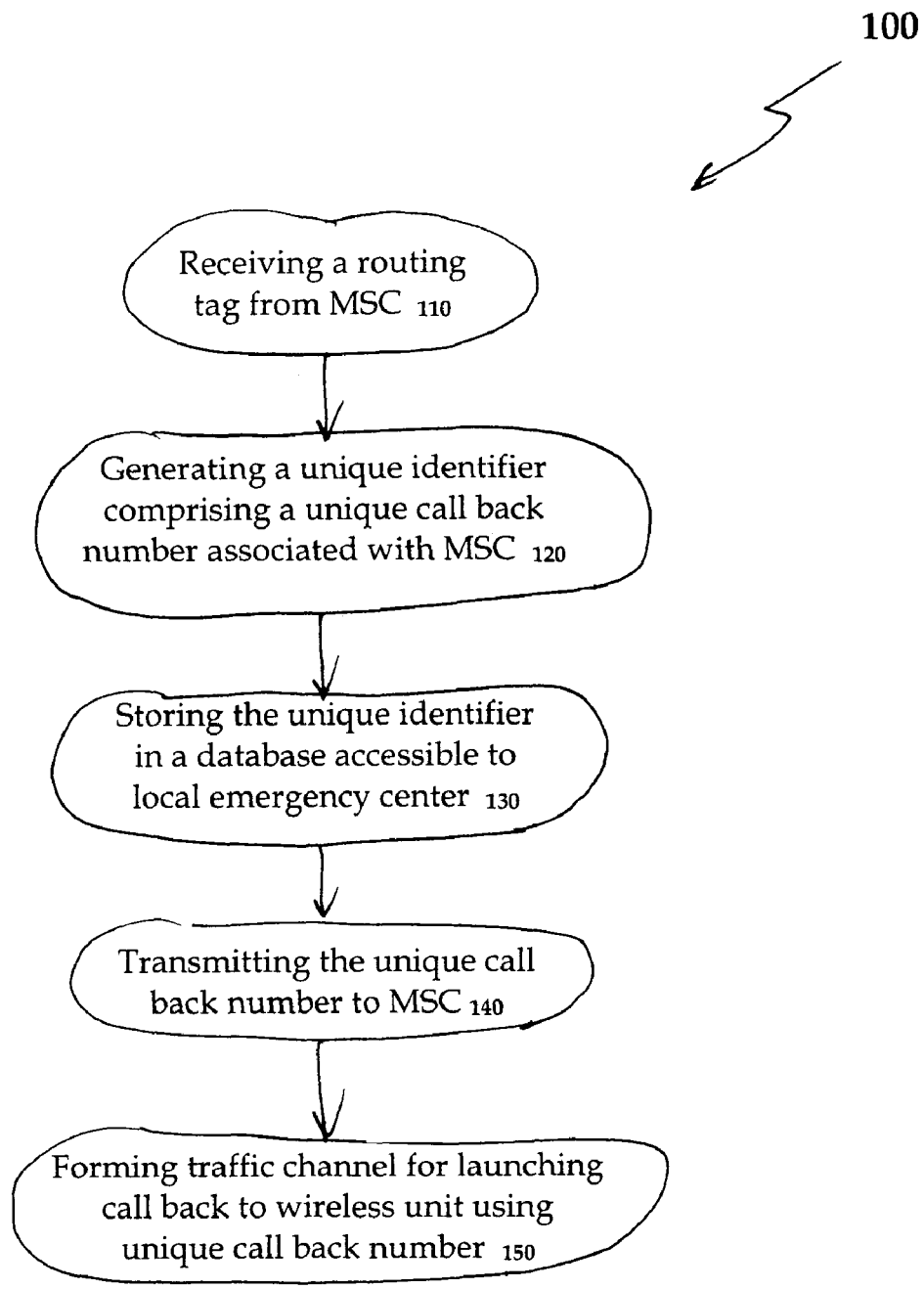

Referring to FIG. 2, a flow chart depicting another embodiment of the present invention is illustrated. More particularly, an algorithmic method (100) is shown for uniquely identifying one or more wireless units originating a "9-1-1" call. More particularly, algorithmic method (100) enables the call back of a wireless unit originating a "9-1-1" call using a unique identifier. This is of particularly relevance if the originating emergency "9-1-1" call was terminated.

The algorithmic method (100) of FIG. 2 may initially include the step of receiving a routing tag (step 110). A routing tag is associated with a wireless unit originating a "9-1-1" call and may, for example be transmitted by mobile switching center 40 and received by emergency call register 50 of FIG. 1. For the purposes of the present disclosure, a routing tag may comprise, for example, a string of numbers corresponding with Emergency Service Routing Digits ("ESRD") and/or an Emergency Service Routing Key ("ESRK"). Consequently, while the routing tag may identify the originating system and destination PSAP, the routing tag may not uniquely identify the emergency "9-1-1" call if it is an ESRD or may be unable to uniquely identify the emergency "9-1-1" call once the originating call is no longer in progress. It should be noted that in practice, this step of receiving may also include receiving the mobile equipment identification number ("MEIN"), as well as the paging identifier ("PGID") along routing tag. It should be also noted that, in practice, the MEIN and PGID may be received prior to the receiving of the routing tag.

Once the step of receiving a routing tag has been achieved, the algorithmic method (100) then includes the step of generating a unique identifier (step 120). Unlike the routing tag, the unique identifier identify the emergency "9-1-1" call even if the originating call is no longer in progress. In one embodiment, the unique identifier may be a ten (10) digit, unique call back number associated with at least one serving mobile switching center. In one embodiment, the unique call back number comprises a string of numbers corresponding with a local public safety number ("LPN") associated with the serving mobile switching center. In one scenario, the unique call back number may comprise six (6) fixed digits associated with the LPN (e.g., NPA+NXX) and four unassigned digits (XXX). In this scenario, the four unassigned digits may translate into 10,000 unique number sequences to be assigned as a result of this generating step.

Thereafter, the algorithmic method (100) may store the generated unique identifier in a database (step 130). The database is accessible to a local emergency center. In one example, the database is realized by emergency call register 60 accessible to PSAP 70 in FIG. 1.

Once generated, the algorithmic method (100) may then transmit the unique identifier (step 140). Here, the unique identifier (e.g., unique call back number) may, for example be transmitted by emergency call register 50 and received by mobile switching center 40 of FIG. 1. As a result, mobile switching center 40 may identifying the emergency "9-1-1" call even if the originating call is no longer in progress. Moreover, the local emergency center, such as PSAP 70, may also identify the emergency "9-1-1" call even if the originating call is no longer in progress, by accessing emergency call register 60.

With the unique call back number accessible to the local emergency center, such as PSAP 70, and mobile switching center 40, the algorithmic method (100) may then form a traffic channel (step 150). This scenario arises in the event the originating emergency "9-1-1" call from the wireless unit is no longer in progress—e.g., disconnected or terminated. After the traffic channel is formed, the local emergency center (e.g., PSAP 70) may call back the wireless unit originated the emergency "9-1-1" call using the unique identifier (e.g., unique call back number).

EXEMPLARY EMBODIMENT

Mobile Emergency Service (E911M) requires the following items to be incorporated into wireless and Emergency Service Network standard protocols and procedures: Local Public Safety Number (LPN); Mobile Equipment Identification Number (MEIN); Mobile Equipment Paging Identity (PGID); Unique Call Back Number (UCBN); Emergency Call Register (ECR); and Mobile E9-1-1 Network.

A Local Public Safety Number (LPN) is a dialable number where the NPA-NXX uniquely identifies the MSC in the originating network. In order to avoid number portability and pooling complexities, the LPN may be taken from the native number block of the MSC.

The Mobile Equipment Identity Number (MEIN) is a unique serial number programmed into a wireless unit by the manufacturer. In CMRS phones, it may take the form of a 32-bit Electronic Serial Number (ESN) in TDMA, CDMA or Analog phones, a 15-digit International Mobile Equipment Identity (IMEI) in GSM, UMTS or PCS1900 phones or a 56-bit Mobile Equipment Identity (MEID) in CDMA2000 phones. Every phone has a MEIN but not every wireless system uses MEIN to page the phone. However, this may be modified as needed to allow a mobile phone that is used to originate an emergency 9-1-1 call to be paged for a call back with its MEIN. The alternative is to create a data field in the ECR called the Paging Identity (PGID) to store one of many possible identifiers that may be used by the serving system to page a mobile phone.

PGID may be the Mobile Subscription Identity (MSID) if it is available from the phone with the emergency 9-1-1 call origination. The MSID may be a 15-digit International Mobile Subscription Identity (IMSI) or a 10-digit Mobile Identification Number (MIN). MSID is not available with an emergency 9-1-1 call origination if a Non-Subscription Initialized (NSI) phone is used to place the call. There is no MSID programmed into a NSI phone by a service provider or in a phone without a Subscriber Identity Module (SIM card). PGID may be a Temporary Mobile Station Identity (TMSI), a default MSID (dMSID) provided by the phone manufacturer and used for Over-The-Air Activation (OTA) of a new phone, a new 56 bit MEID or a pseudo-ESN (pESN) derived from the MEID. The PGID is whatever identity a wireless phone provides for itself when it enters a system and is acceptable by that system to page that phone for a call back.

The Unique Callback Number (UCBN) is dynamically assigned at the serving system when a 9-1-1 call is originated. It is stored in the ECR as a key to the database. The UCBN is signaled with every emergency 9-1-1 call to uniquely identify the emergency 9-1-1 call, retrieve call back information from the PSAP-ECR and originate a call back. The UCBN is a unique 10-digit dialable number based on the NPA-NXX from the LPN of the serving system. The last four digits are uniquely assigned to each call at the serving system. The UCBN is not a Mobile Directory Number (MDN) or Mobile Station ISDN Number (MSISDN) assigned to the calling subscriber by the home service provider. If the UCBN is used for call back, it is signaled to the serving system MSC as the Called Party Number (CPN). The MSC uses the UCBN to request a PGID from the SS-ECR. The PGID is then used to page the phone and complete the callback.

Based on existing guidelines, the UCBN may be signaled from the MSC to the Selective Router and on to the PSAP as the Call Back Number (CBN) in the Calling Party Number (CPN) or the Charge Number (CHGN) when the ESRD is populated in either the Generic Digits Parameter (GDP) or the Called Party Number (CdPN). When the ESRK is populated as the either the CPN or CHGN, the UCBN may be populated in the other field or in the GDP.

If the UCBN is not signaled with a call routed by the ESRK, then the PSAP may use the ESRK while the call is still in progress to obtain the UCBN from the PSAP-ECR or the ALI. ALI may get the UCBN from the PSAP-ECR or the MPC. MPC may have the UCBN if it is provided by the MSC.

The Emergency Call Register (ECR) is a database holding emergency call detail information and call handling instructions for the MSC. The ECR database is keyed on the UCBN and contains the MEIN, PGID. ESRK or ESRD for the emergency 9-1-1 call, as well as the LPN of the serving system. The LPN may be updated automatically as the wireless unit originating the emergency 9-1-1 caller roams and is handed off (or over) from one serving system to another.

ECR entries may be created in different ways. An entry may be created at the originating network with the origination of a 911 call, through a download of entries from other ECRs or by manual entry. Manual entry of a MEIN and any local LPN into a ECR associated with the PSAP allows the PSAP to call any wireless unit through the MSC even if the wireless unit was not used to originate an emergency 9-1-1 call. LPN Update procedures allow for the LPN of the serving system to be automatically entered into the SS-ECR after the wireless unit is located in the true serving system. The LPN is updated in other PSAP-ECRs and SS-ECRs through the Mobile E-9-1-1 Network.

The Mobile E9-1-1 Network may be used to exchange data between ECRs and trigger events in other network elements. An ECR is located with an MSC at the serving system (SS-ECR), a PSAP in the Emergency Services Network (PSAP-ECR), and any other call center handling emergency calls. For example, a secondary PSAP or a Telematics Call Center may have an ECR to track 9-1-1 calls and other outbound calls placed for their clients, to track inbound calls from clients or to remotely request service for clients through the serving system.

The ECR Network is used for more than exchanging emergency call information and tracking individual phones. The ECR network is also used to manage mobility for mobile phones used to place an emergency 9-1-1 call and request services through the MSC. Messages are signaled through the network to support intersystem operations for Intersystem Roaming and Emergency Short Message Service for NSI Phones and International Roamers, Emergency Call Origination through the MSC for Telematics Call Centers, PSAP-to-PSAP Call Forwarding or Conference Calling through the MSC, LPN Update, Intersystem Paging for Emergency Call Back and possibly many other services. The PSAP-ECR acts like a Home Location Register (HLR) and the SS-ECR acts like a Visitor Location Register (VLR).

Referring to FIG. 3, a signal flow diagram 200 according to an exemplary embodiment of the present invention is illustrated. FIG. 3 depicts the process in the origination of an emergency "9-1-1" call by a wireless unit. Here, an emergency "9-1-1" call is originated by a wireless unit through a serving MSC using a routing tag, such as an ESRD ("Emergency Service Routing Digits") or an ESRK ("Emergency Service Routing Key"). The emergency "9-1-1" call may be routed to a geographically designated PSAP call center based on the routing tag—e.g., the corresponding ESRD or ESRK. An emergency call register ("ECR") coupled with the serving MSC and the PSAP call center may then be updated with call back information. Thereafter, a unique identifier may be generated for uniquely identifying the emergency "9-1-1" call. This unique identifier may be realized by a unique call back number derived from a local public safety number. Moreover, the routing tag—the corresponding ESRD or ESRK—may identify the originating system and destination PSAP. It should be noted that an ESRD does not uniquely identify the call, while an ESRK may be used to uniquely identify the call so long as the call is in progress.

Referring to FIG. 4, a signal flow diagram 300 according to another exemplary embodiment of the present invention is illustrated. FIG. 3 depicts the process of calling back the wireless unit, which originated the emergency "9-1-1" call. After the original emergency "9-1-1" call was terminated, the PSAP may dial the unique identifier (e.g., unique call back number) derived from a local public safety number to reach the wireless unit originating the emergency "9-1-1" call. Here, the MSC uses the unique identifier to retrieve an associated paging identifier ("PGID") from a serving system emergency call register ("SS-ECR"), page the wireless unit and then complete the call back to the wireless unit. Alternatively, the PSAP may use the unique identifier or the mobile equipment identification number to request a call back from through the MSC from the PSAP emergency call register ("PSAP-ECR").

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center, for example. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of communication with at least one wireless unit originating an emergency call, the method comprising:
   receiving at least one routing tag associated with the at least one wireless unit from which the emergency call is received;
   generating a unique call back number in response to receiving the at least one routing tag, the unique call back number being associated with at least one mobile switching center (MSC) serving the at least one wireless unit, the unique call back number including a string of numbers corresponding with a local public safety number associated with the at least one MSC and a string of numbers assigned to the unique call back number upon receiving the at least one routing tag;
   storing the unique call back number in at least one emergency call register directly accessible by a local emergency center such that there is no intervening network infrastructure element between the at least one emergency call register and the local emergency center; and
   transmitting the unique call back number to uniquely identify the at least one wireless unit in response to the step of receiving at least one routing tag.

2. The method of claim 1, wherein the at least one routing tag includes a string of numbers corresponding with at least one of a Emergency Service Routing Digits and a Emergency Service Routing Key.

3. The method of claim 2, wherein the step of receiving at least one routing tag comprises:
   receiving at least one of a mobile equipment identification number and a paging identity with the at least one routing tag.

4. The method of claim 1 further comprising: launching an emergency call back using the stored unique call back number.

5. The method of claim 2, wherein the Emergency Service Routing Digits comprises a string of numbers associated with a cell sector of the mobile switching center in which the emergency call originates, and the Emergency Service Routing Key comprises a string of numbers associated with at least one of a mobile positioning center and geographical mobile location center.

6. A method of communication to at least one wireless unit originating an emergency call, the method comprising:

transmitting at least one routing tag associated with the at least one wireless unit:

storing a unique call back number in at least one emergency call register directly accessible by a local emergency center such that there is no intervening network infrastructure element between the at least one emergency call register and the local emergency center, the unique call back number including a string of numbers corresponding with a local public safety number associated with at least one mobile switching center (MSC) and a string of numbers assigned to the unique call back number upon transmitting the at least one routing tag; and receiving, from the at least one emergency call register, the unique call back number being associated with the at least one MSC serving the at least one wireless unit in response to the step of transmitting at least one routing tag.

7. The method of claim 6, comprising:

receiving a launched emergency call back using the received unique call back number.

8. The method of claim 7, wherein the step of receiving a launched emergency call back comprises:

forming a traffic channel to support receiving the launched emergency call back.

9. The method of claim 8, wherein the at least one routing tag includes a string of numbers corresponding with at least one of a Emergency Service Routing Digits and a Emergency Service Routing Key.

10. The method of claim 9, wherein the step of transmitting at least one routing tag comprises:

transmitting at least one of a mobile equipment identification number and a paging identity.

11. The method of claim 6, wherein the step of receiving the unique call back number comprises: accessing the at least one emergency call register having the unique call back number stored therein using the at least one routing tag.

12. The method of claim 11, wherein the Emergency Service Routing Digits comprises a string of numbers associated with a cell sector of the mobile switching center in which the emergency call originates, and the Emergency Service Routing Key comprises a string of numbers associated with at least one of a mobile positioning center and geographical mobile location center.

* * * * *